United States Patent
Arai et al.

(10) Patent No.: US 7,795,822 B2
(45) Date of Patent: Sep. 14, 2010

(54) LIGHT SOURCE CONTROLLER AND IMAGE DISPLAY DEVICE

(75) Inventors: Kazuhiro Arai, Daito (JP); Yoshihiro Yokote, Hirakata (JP); Ryuhei Amano, Hirakata (JP); Masutaka Inoue, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 795 days.

(21) Appl. No.: 11/798,247

(22) Filed: May 11, 2007

(65) Prior Publication Data

US 2008/0042578 A1  Feb. 21, 2008

(51) Int. Cl.
*G05F 1/00* (2006.01)

(52) U.S. Cl. .................. 315/309; 315/297; 315/312; 315/291; 353/85; 353/52; 348/748; 348/751; 348/756

(58) Field of Classification Search .......... 315/309, 315/297, 294, 291, 307, 312; 353/85, 52; 348/748, 751, 756, 744, 750, 771, 761; 362/257, 362/259, 264
See application file for complete search history.

(56) References Cited

U.S. PATENT DOCUMENTS

| | | | | |
|---|---|---|---|---|
| 5,614,961 A | * | 3/1997 | Gibeau et al. | 348/750 |
| 5,877,846 A | * | 3/1999 | Tahara et al. | 355/67 |
| 6,467,911 B1 | * | 10/2002 | Ueyama et al. | 353/87 |
| 6,683,657 B1 | * | 1/2004 | Miyawaki | 348/743 |
| 7,111,962 B2 | * | 9/2006 | Meguro et al. | 362/294 |
| 7,566,143 B2 | * | 7/2009 | Furukawa et al. | 362/231 |

FOREIGN PATENT DOCUMENTS

| JP | 2004-144794 | 5/2004 |
|---|---|---|
| JP | 2006-018196 | 1/2006 |

* cited by examiner

*Primary Examiner*—Haissa Philogene
(74) *Attorney, Agent, or Firm*—NDQ&M Watchstone LLP

(57) ABSTRACT

A light source controller includes a light source driver, a light amount sensor, a memory configured to store property information indicating a relationship between the drive current and the outgoing light amount for each level of the environmental temperature of the solid-state light source, and a controller configured to control the drive current supplied from the light source driver. The controller obtains the property information corresponding to the environmental temperature of the solid-state light source according to the relationship between the drive current and the outgoing light amount, and controls the drive current according to the obtained property information so as to bring the outgoing light amount close to a target light amount.

9 Claims, 11 Drawing Sheets

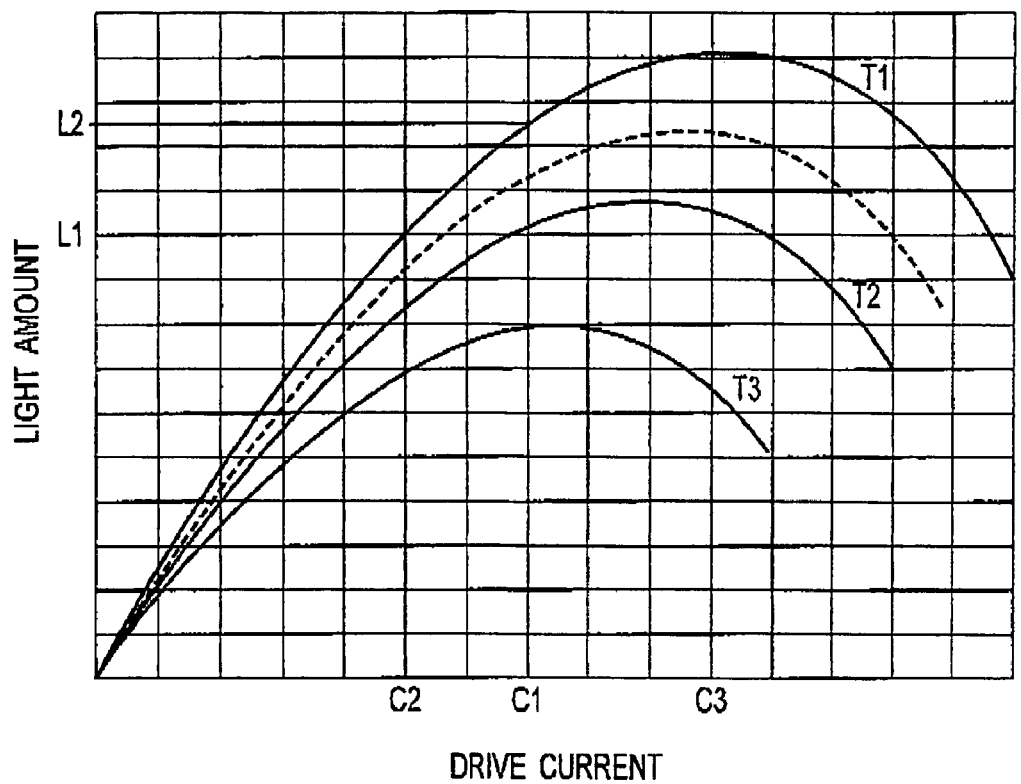

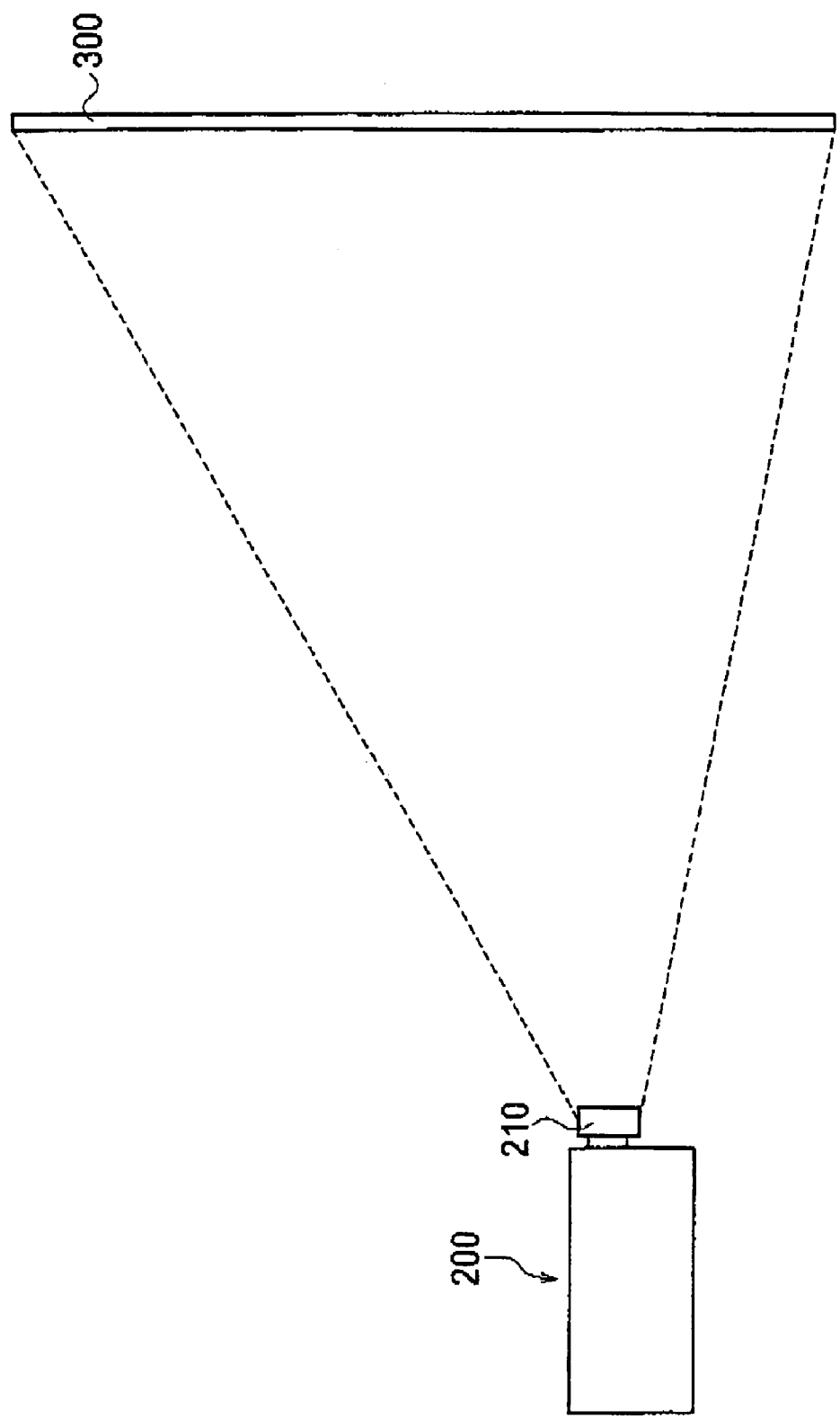

FIG. 11A
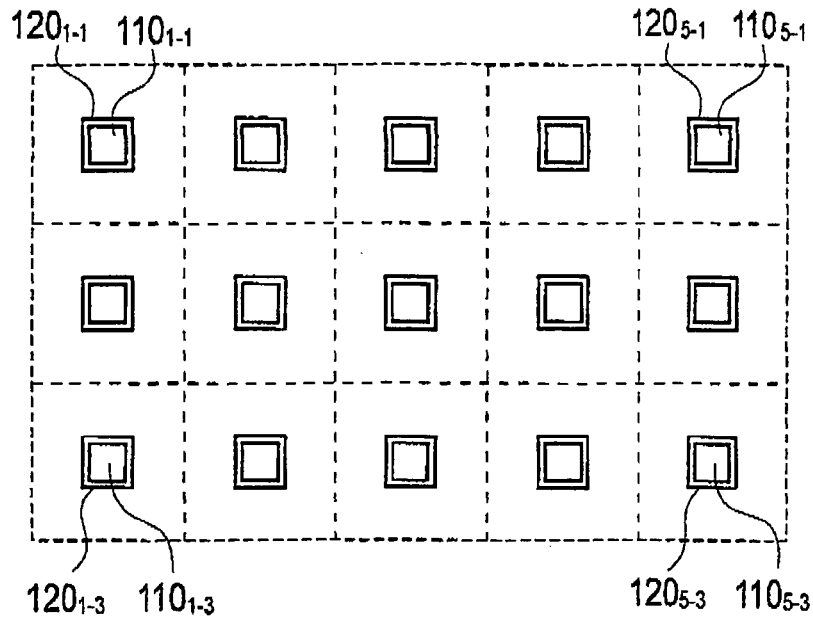
FIG. 11B
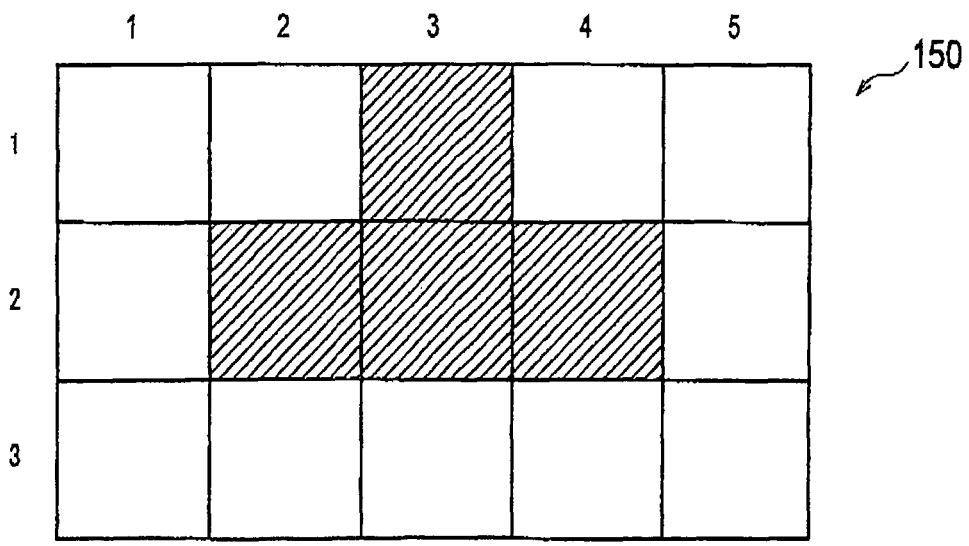
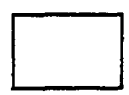 ···NORMAL LUMINANCE SEGMENTED REGION
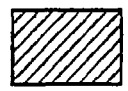 ···HIGH LUMINANCE SEGMENTED REGION

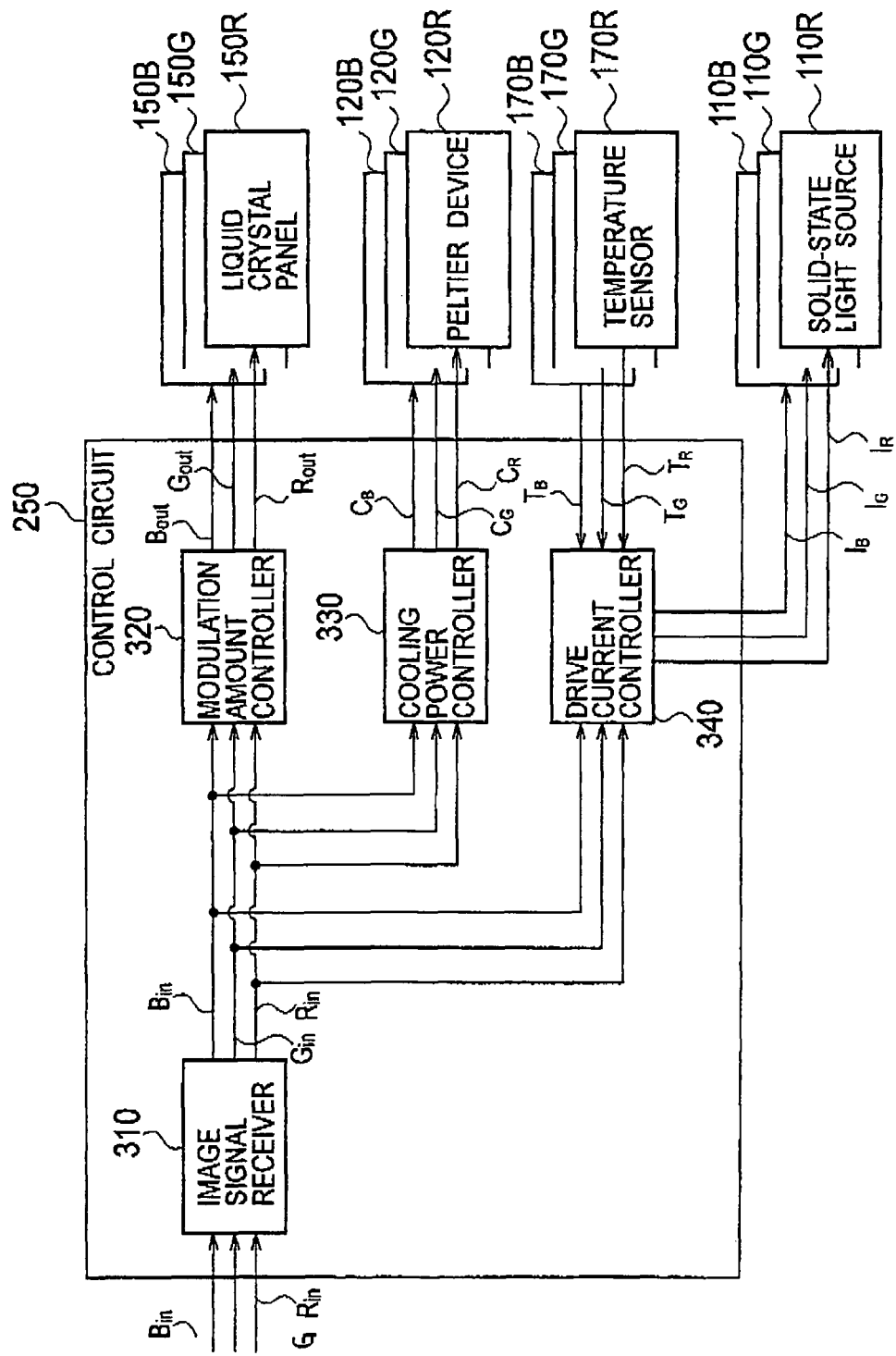

LIGHT SOURCE CONTROLLER AND IMAGE DISPLAY DEVICE

CROSS REFERENCE TO RELATED APPLICATIONS

This application is based upon and claims the benefit of priority from prior Japanese Patent Application No. 2006-134363, fled on May 12, 2006; prior Japanese Patent Application No 2006-296544, filed on Oct. 31, 2006, and prior Japanese Patent Application No. 2007-125323, filed on May 10, 2007, the entire contents of which are incorporated herein by reference.

BACKGROUND OF THE INVENTION

1. Field of the Invention

The present invention relates to a light source controller and an image display device that include solid-state light sources.

2. Description of the Related Art

Conventionally, there has been known an image display device including a solid-state light source such as a light emitting diode (LED) or a laser diode (LD), and an optical modulator that modulates light emitted by the solid-state light source (for example, Japanese Patent Application Laid-open Publication NO. 2006-18196). In the image display device, the solid-state light source generates heat when power is supplied to the solid-state light source. When the environmental temperature of the solid-state light source increases, the light amount emitted by the solid-state light source decreases.

Note that another image display device provided with a cooling device for cooling a solid-state light source has been also proposed for the purpose of reducing a decrease of the light amount, the decrease caused due to heat generated by the solid-state light source (for example, Japanese Patent Application Laid-open Publication NO. 2004-144794 (claim 1, paragraphs [0036] and [0037], FIG. 3)).

Here, by taking an LED (light-emitting diode) light source as example, it is known that a drive current-light amount property varies in proportion to a change of the environmental temperature of the LED light source.

For example, as shown in FIG. 3, a red LED has a property (also called an over-roll below) in which the outgoing light amount increases up to a certain level in proportion to an increase of the drive current, while the outgoing light amount conversely decreases beyond the certain level of the drive current. Moreover, the red LED has a property in which the higher the environmental temperature becomes, the more largely the outgoing light amount decreases even when the same drive current is applied to the red LED. Here, for example, in FIG. 3, T1 denotes a room temperature (for example, 20° C.), T2 denotes a steady temperature at a time when the light source is lighting, and T3 denotes a temperature higher than the steady temperature. In short, the relationship among the environmental temperatures is T1<T2<<T3.

In general, a drive current supplied to a solid-state light source is controlled by a certain step width ($\Delta C$). Specifically, when the light amount emitted by a solid-state light source is short, the drive current is increased by a certain step width, and then a determination is made as to whether or not the light amount emitted by the solid-state light source reaches a target light amount. The drive current is controlled by repeating such processing so that the light amount emitter by the solid-state light source would reach a certain light amount (the target light amount).

However, in the case of the conventional technique, the light amount emitted by a solid-state light source fails to quickly reach the target light amount in some cases, since the drive current is controlled by the certain step wide. In other words, it is difficult to determine the increasing amount of drive current so that the light amount emitted by the solid-state light source reaches the target light amount, since the drive current-light amount properties are influenced by the environmental temperature of the solid-state light source as shown in FIG. 3.

SUMMARY OF THE INVENTION

In a first aspect of the present invention, a light source controller includes a light source driver, a light amount sensor, a memory and a controller. The light source driver supplies a drive current to a solid-state light source. The light amount sensor detects the outgoing light amount from the solid-state light source. The memory stores property information indicating a relationship between the drive current and the outgoing light amount for each level of environmental temperatures of the solid-state light source. The controller controls the drive current supplied from the light source driver. The controller obtains the property information corresponding to the environmental temperature of the solid-state light source according to the relationship between the drive current supplied from the light source driver, and the outgoing light amount detected by the light amount sensor. Then, the controller controls the drive current so as to bring the outgoing light amount dose to a target light amount, according to the obtained property information.

In this aspect, the controller obtains the property information corresponding to the environmental temperature of the solid-state light source according to the relationship between the drive current supplied from the light source driver and the outgoing light amount detected by the light amount sensor, and then controls the drive current so as to bring the outgoing light amount close to the target light amount, according to the obtained property information (the drive current-light amount property).

In other words, the controller controls the drive current of the solid-state light source while recognizing the property information (the drive current-light amount property) corresponding to the environmental temperature of the solid-state light source. Accordingly, it is easy to determine the control of the drive current for causing the outgoing light amount to be the target light amount. This makes it possible to cause the light amount emitted from the solid-state light source to reach the target light amount quickly.

In the foregoing aspect of the present invention, when the memory does not store the property information corresponding to the environmental temperature of the solid-state light source, it is preferable that the controller controls the drive current as follows. Specifically, the controller firstly specifies the property information corresponding to the environmental temperature approximate to the environmental temperature of the solid-state light source, out of the property information stored in the memory. The controller then calculates the property information corresponding to the environmental temperature of the solid-state light source by using the specified property information. Thereafter, the controller controls the drive current so as to bring the outgoing light amount close to the target amount, according to the calculated property information.

In the foregoing aspect of the present invention, it is preferable that the controller controls the drive current supplied from the light source driver so that the drive current would not exceed the maximum drive current that maximizes the outgoing light amount in the obtained property information.

In a second aspect of the present invention, an image display device includes at least one optical modulator configured to modulate outgoing light from a solid-state light source, a projection lens configured to project the light modulated by the at least one optical modulator, and a light source controller according to the foregoing first aspect of the present invention.

In a third aspect of the present invention, an image display device includes at least one optical modulator configured to modulate outgoing lights from a plurality of solid-state light sources, a projection lens configured to project the lights modulated by the at least one optical modulator, and a light source controller according to the foregoing first aspect of the present invention. In a case where the drive current of one of the plurality of solid-state light sources is controlled so as to exceed the maximum drive current, the controller controls the drive currents of the other ones of the plurality of solid-state light sources while maintaining the white balance reproduced by the outgoing lights from the plurality of solid-state light sources.

In a fourth aspect of the present invention, an image display device includes a solid-state light source (a solid-state light source 110), an optical modulator (a liquid crystal panel 150) configured to modulate outgoing light from the solid-state light source, a cooling device (a Peltier device 120) configured to cool the solid-state light source, a signal receiver (an image signal receiver 310) configured to receive an image signal used for determining a modulation amount of the optical modulator, and a cooling power controller (a cooling power controller 330) configured to control a cooling power of the cooling device according to the image signals received by the signal receiver.

In this aspect, the cooling power controller controls the cooling power of the cooling device according to the image signal received by the signal receiver. Thereby, a high current is not continuously supplied to the cooling device, and thus the environmental temperature of the solid-state light source can be appropriately decreased. Accordingly, without increasing the current amount supplied to the solid-state light source, the luminance of images can be increased as needed.

In other words, it is possible to increase the luminance of images while suppressing loads imposed on the solid-state light source and the cooling device.

In the foregoing fourth aspect of the present invention, it is preferable that the solid-state light source includes a plurality of solid-state light sources respectively provided to a plurality of segmented regions provided in the optical modulator, that the cooling device includes a plurality of cooling devices respectively provided to the plurality of solid-state light sources, and that the cooling power controller controls the cooling powers of the plurality of cooling devices according to the image signals corresponding to the respective segmented regions.

In the foregoing fourth aspect of the present invention, it is preferable that the cooling device is a Peltier device including an absorption surface (an absorption surface 21) from which heat is removed by power supply, and a heat radiation surface (a heat radiation surface 22) to which the heat removed from the absorption surface by the power supply is transferred, that the absorption surface is provided with the solid-state light source, and that the heat radiation surface is provided with a heat radiation member (a heat sink 130) for radiating the heat transferred to the heat radiation surface.

In the foregoing fourth aspect of the present invention, the image display device preferably has the following features. Specifically, the image display device further includes a drive current controller (a drive current controller 340) configured to control the drive current of the solid-state light source, and a detection unit (a temperature sensor 70) configured to detect the environmental temperature of the solid-state light source. In a case where the luminance of an image to be displayed according to the image signal exceeds a predetermined threshold value, the cooling power controller increases the cooling power of the cooling device before the image having the luminance exceeding the threshold value is displayed. The drive current controller decreases the drive current of the solid-state light source with a decrease of the environmental temperature of the solid-state light source, and increases the drive current of the solid-state light source when the image having the luminance exceeding the threshold value is displayed.

BRIEF DESCRIPTION OF THE DRAWINGS

FIG. 3 is a graph showing a drive current-light amount property depending on a temperature.

FIG. 4 is an explanatory diagram showing contents of tables according to the first embodiment.

FIG. 5 is a diagram showing an outline of a projection image display device 200 according to a second embodiment.

FIGS. 11A and 11B are conceptual diagrams for explaining a method for controlling a cooling power of a Peltier device 120 according to a third embodiment.

FIG. 12 is a block diagram showing a configuration of a control circuit 250 according to a fourth embodiment.

DETAILED DESCRIPTION OF THE EMBODIMENTS

Figure 1:
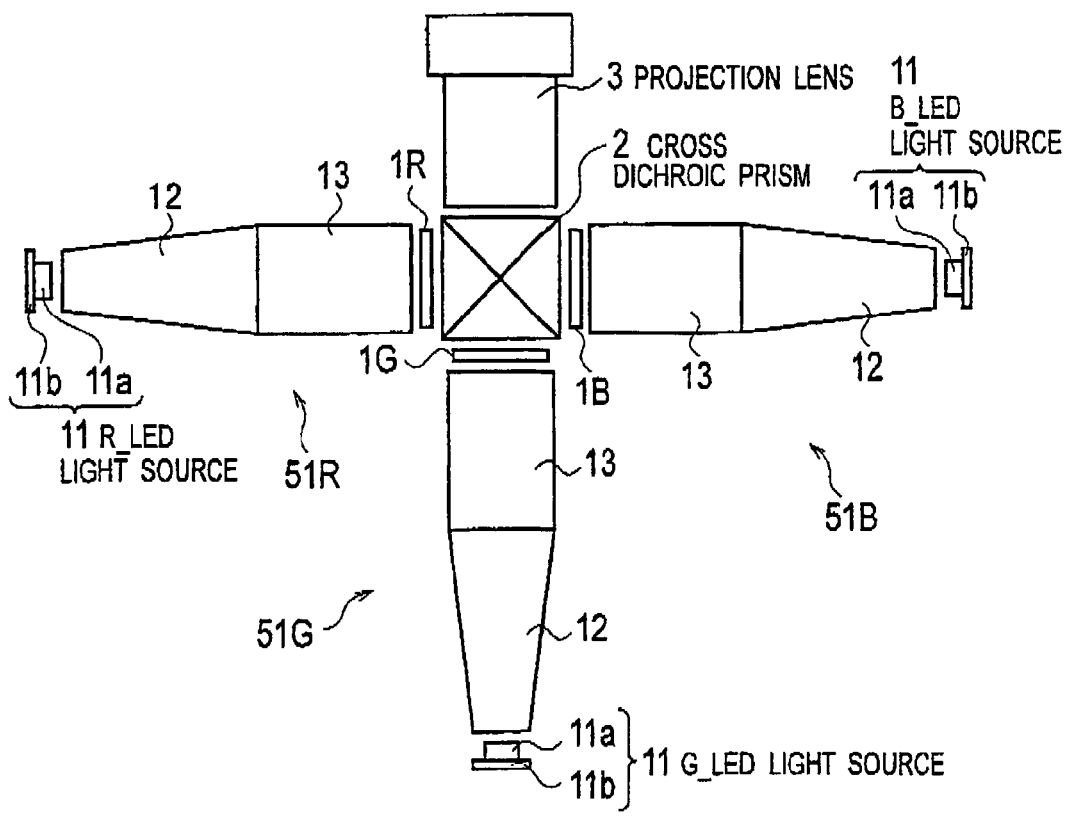
FIG. 1 is an explanatory diagram showing an example of an optical system of a projection image display device according to a first embodiment.

Hereinafter, descriptions will be provided for an image display device according to an embodiment of the present invention by referring to the drawings. Note that the same or similar reference numerals are given to the same or similar components in the following descriptions of the drawings.

In addition, note that dimensional ratios and others in each drawing are different from actual ones, since the drawings are only schematic ones. Accordingly, it is to be understood that specific dimensions and others should be determined in consideration of the following descriptions. Moreover, as a matter of course, any of the drawings may include a part showing a different relation or ratio of dimensions from that in the other drawings.

First Embodiment

A first embodiment will be described by using FIGS. 1 to 4.

FIG. 1 is an explanatory diagram illustrating an optical system of a projection image display device. This projection image display device includes three lighting systems 51R, 51G and 51B. Each of the lighting systems 51R, 51G and 51B includes an LED (light-emitting diode) 11 serving as a light source and a rod integrator. The rod integrator is composed of a tapered rod integrator portion 12 and a rod integrator portion 13 having a rectangular parallelepiped shape. Liquid crystal display panels 1R, 1G and 1B each serving as an optical modulator are disposed at the light exit sides of the lighting systems 51R, 51G and 51B, respectively.

Each of the LEDs 11 is composed of an LED chip 11a and a heat sink 11b. An LED chip 11a of the lighting system 51R emits a red light, an LED chip 11a of the lighting system 51G emits a green light, and an LED chip 11a of the lighting system 51B emits a blue light.

A light of each color is emitted from a corresponding one of the lighting systems 51, and then passes through a corresponding one of the liquid crystal display panels 1R, 1G and 1B. Thereby, an image light of each color is generated. Thereafter, the image lights of all the colors are combined by a cross dichroic prism 2 instead, a cross dichroic mirror may be employed), and thus a color image light is generated. This color image light is projected by a projection lens 3.

Note that, although not illustrated in FIG. 1, a fan for blowing the air to the heat sink 11b (air-cooling) may be provided, or a liquid coolant may be circulated in the heat sink 11b to prevent the temperature of the LED chip 11a from increasing.

Figure 2:
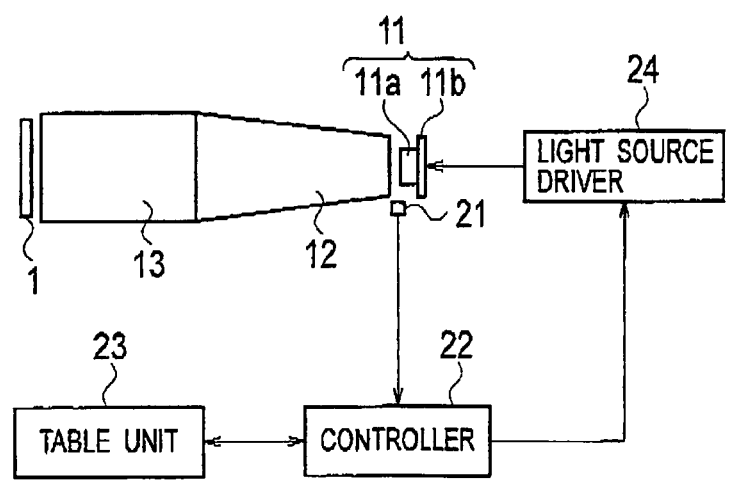
FIG. 2 is an explanatory diagram illustrating a light source controller according to the first embodiment.

FIG. 2 is a block diagram showing one example of a light source controller. A light amount sensor 21 is provided at a place near an illumination light path. To be more precise, the light amount sensor 21 is disposed at a place which is at an oblique side of an LED chip 11a, and which is a little bit away from the light incident surface of the tapered rod integrator portion 12. An output from the light amount sensor 21 is received by a controller 22. The light amount sensor 21 is composed, for example, of a photo diode, or an element whose resistance changes according to the light amount. In addition, a light source driver 24 drives the LED chip 11a by using a current value specified by the controller 22.

A table unit 23 retains drive current-light amount properties of the LED chip 11a under plural levels of the temperature in data tables shown in FIG. 4. For example, in a memory, the table unit 23 stores digital data on the drive current-light amount properties under the foregoing temperatures T1, T2 and T3 in FIG. 3. Note that each of the data tables may not have to include data on the drive current-light amount property after its peak point of the light amount (the maximum value of the drive current is a drive current value immediately before the peak point in each data table). Instead, the data table may include the data on the drive current-light amount property after its peak point. However, in this case, it is preferable that the data table include the drive current value at the peak point. Alternatively, the controller 22 can obtain the drive current value at the peak point in each data table by searching the inside of the data table.

The controller 22 executes the following processing (control. This processing consists of processing of selecting a table (including a judgment as to whether to change or to keep using a selected table), and processing of generating a drive current value according to a selected table.

(1) By using a drive current value (C) at a present time, the controller 22 retrieves a light amount data piece (L) corresponding to the present drive current value (C) included in each of the tables (a T1 table, a T2 table and a T3 table) from the table unit 23. For example, in the case illustrated in FIG. 4, the controller 22 retrieves a light amount data piece (L2) corresponding to the present drive current value C1 from the T1 table, and a light amount data piece (L1) corresponding thereto from the T2 table. In addition to them, the controller 22 retrieves a predetermined light amount data piece from the T3 table.

(2) The controller 22 figures out the difference between each of the light amount data pieces (L) and the present light amount obtained on the basis of a sensor output received from the light amount sensor 21, and selects a (matching) table including the light amount data piece (L) whose difference from the present light amount is zero (0). For example, the controller 22 selects the T1 table when the drive current value at the present time is C1, and when the present light amount obtained on the basis of the sensor output received from the light amount sensor 21 is L2. In other words, the controller 22 obtains, from the table unit 23, the property information (the T1 table) corresponding to the environmental temperature of the LED 11, according to the relationship between the drive current supplied from the light source driver 24 and the outgoing light amount detected by the light sensor 21. When there is no light amount data piece having the difference 0, the controller 22 selects a (matching) table including the light amount data piece having the difference that is the smallest and that is within an acceptable range. In other words, from the table unit 23, the controller 22 obtains the property information (one of the tables) corresponding to the environmental temperature approximate to the environmental temperature of the LED 11, according to the relationship between the drive current supplied from the light source driver 24 and the outgoing light amount detected by the light sensor 21. When there is no matching table, a temporal and tentative table may be generated and held. Specifically, the tentative table is generated by figuring out an intermediate value between two data tables which are approximate to the output value of the light amount sensor 21 and the drive current value at this time, and which are adjacent to each other (see a dotted line in FIG. 3). More specifically, in a case where the property information (table) corresponding to the environmental temperature of the LED 11 is not stored in the table unit 23, the controller 2 specifies the property information pieces corresponding to the environmental temperatures approximate to the environmental temperature of the LED 11. Then, the controller 22 calculates the property information piece corresponding to the environmental temperature of the LED 11 by using the thus specified property information pieces. It is possible to calculate the intermediate value by assigning weights depending on which one of the two tables is more approximate to the intermediate value. Note that the more easily the matching table can be obtained, the more the number of tables increases (the accuracy is increased). However, this requires a larger memory capacity. Accordingly, the number of tables is determined in consideration of a trade-off between the accuracy and the memory capacity.

The controller 22 executes the table selection processing (including processing of determining whether to change or to keep using the selected table) at intervals of 1 second, 5 seconds, 10 seconds or the like.

(3) The controller 22 acquires the drive current value (C) from the selected table (or the tentative table) used for obtaining a desirable light amount (L), and gives the drive current value (C) to the light source driver 24. The light source driver 24 drives the LED chip 11*a* by using the drive current value (C) specified by the controller 22. For example, the drive current value is C2 when the selected table is the T1 table, and when the desirable light amount (target light amount) is L1.

Although the description will be provided repeatedly, on the assumption that the light amount L1 is the desirable light amount, and that it is under the steady temperature (T2) at a time when the light source is lighting, the necessary drive current is C1. Accordingly, the light source driver 24 firstly drives the LED chip 11*a* at drive current C1 when the LED chip 11*a* starts lighting. Immediately after applying the current to the LED chip 11*a*, the temperature of the LED chip 11*a* is equal to the room temperature (T1). Accordingly, the light amount is supposed to be L2 when the LED chip 11*a* is driven with the drive current C1. For this reason, the controller 22 selects the T1 table corresponding to the present light amount (the sensor output) in the table selection processing. Then, the controller 22 acquires C2 from the selected table as the drive current value for obtaining the target light amount L1, and the light source driver 24 drives the LED chip 11*a* by using the drive current value C2. Since the temperature of the LED chip 11*a* increases soon, the controller 22 selects the T2 table in the table selection processing (processing of determining whether to change or keep using the selected table) in the next or subsequent time. Thereafter, the controller 22 acquires C1 from the T2 table as the drive current value for obtaining the target light amount L1, and the light source driver 24 drives the LED chip 11*a* by using the drive current value C1.

In addition, assuming that the temperature of the LED chip 11*a* approaches to the temperature T3 to some extent due to some kind of trouble, the T3 table or the tentative table is selected. However, the drive current beyond the peak point of the light amount is prevented from being supplied, because the current value beyond the peak point is not included in the data table (the maximum drive current value is the current value immediately before the peak point in each table), or because the controller 22 acquires the current value of the peak point in advance.

The foregoing light source control may be executed for all the lighting systems 51 of the three primary colors. More precisely, when an LED is made of some constituent material, a blue LED or a green LED may sometimes be subjected to a change in the drive current-light amount property, or the over-roll due to an increase of the temperature. When a light source of each color is controlled with data tables on the drive current-light amount properties with respect to an LED of each color, the outgoing light amount of a lighting system of each color can be appropriately controlled.

Alternatively, the light source control according to the present invention may be executed only for one or two color light sources each having the drive current-light amount properties that change to a large extent according to the temperature (also having an over-roll property), while the simple feedback control (see the section "Description of the Related Art") may be executed for the other light source(s) each having the drive current-light amount properties that change to a small extent according to the temperature (also not having an over-roll property). Note that setting the target light amount for each of the color light sources and making the control for maintaining these target light amounts result in maintaining the white balance.

In addition, when the light amount for a certain color light source is required to be further increased beyond the light amount at the peak point in the drive current-light amount property of the color light source (such an image signal is inputted), the drive currents for the other color light sources may be limited for the purpose of maintaining the white balance. In other words, from the viewpoint of preventing the drive current beyond the peak point in the drive current-light amount property from being supplied, and of maintaining the white balance, the white luminance may be controlled under the imitation of the light amount at the peak point in the drive current-light amount property of each color light source.

Instead, the controller 22 may be configured to analyze one frame image of image signals (RGB signals) when the image signals are inputted. To be more precise, the controller 22 detects the red color intensity (red tone signals), the green color intensity (green tone signals) and the blue color intensity (blue tone signals) for all pixels constituting one frame image. Here, suppose that the color intensity of each color ranges from 0 to 99, that the light transmission amount of each of the liquid crystal display panels 1 is controlled by 100 tones, and that each of the lighting systems 51 is capable of adjusting the light amount by 100 levels. When the red color intensity is 0 in all the pixels in the one frame image, the controller 22 gives the light source driver 24 a control signal for causing the gain of the lighting system 51R to become 0 (the minimum light amount). In response to the control signal the light source driver 24 controls the current supplied to the lighting system 51R. In addition, the controller 22 issues a drive command to an LCD signal processor, which is not illustrated, the drive command instructing the LCD signal processor to cause the light transmission amounts for all the pixels of the liquid crystal display panel 1R to be 0, for example. The LCD signal processor drives the pixels of the liquid crystal display panel 1R according to the drive command. When the maximum value of the red color intensity is 50 in one frame image, the light transmission amounts of the pixels each having the red color intensity value of 50 are set to 100, and the outgoing light amount of the lighting system 51R is set to 50 (when the T2 table is selected, a current value C corresponding to the light amount L1/2 is figured out, and then the light source is driven by using the current value C). With respect to each of the other pixels having the red color intensity, the original red color intensity based on the image signal is corrected to correspond to the control in which the outgoing light amount of the lighting system 51R is set to 50. Although such a control can minimize the power consumption in the lighting systems 51, the control method is not limited to this. For example, a control may be made so that the light transmission amounts of the pixels each having the red color intensity value of 50 would be set to 70, and that the outgoing light amount would be set to 70. In this case, with respect to each of the other pixels having the red color intensity, the original red color intensity based on the image signal is corrected to correspond to the control in which the outgoing light amount of the lighting system 51R is set to 70. Further, the same control can be also made for the other colors.

Here, when the outgoing light amount of the light source (LED) itself is controlled according to image signals as described above, the light source cannot be maintained at the steady temperature (T2) at the time when the light source is lighting, and the temperature frequently changes on a time base. Even when the temperature of the light source changes frequently, according to this embodiment of the present invention, it is possible to cause the light source to emit the target light amount while quickly following the change of the temperature.

Moreover, the three-plate type projection image display device is described in the aforementioned example, but the light source control of the present invention is also applicable to a single-plate type projection image display device (a light source including a white LED or a light source in which a cross dichroic cube or the like combines lights from LEDs that emit lights of different colors) or a three-plate type projection image display device in which a light from a white light source is separated into color lights by a dichroic mirror. As a matter of course, an optical modulator modulating light is not limited to a transmissive liquid crystal panel, but a reflective liquid crystal panel or an optical modulator in which a large number of small mirrors are arranged may be used.

In addition, the aforementioned light amount sensor 21 is likely to fail to accurately detect the temperature due to an influence of the heat from the LED 11, since the light amount sensor 21 is provided near the LED 11 that is the light source. To avoid this, a heat sink may be provided at the back side of the light amount sensor 21. Alternatively, the aforementioned heat sink for cooling the light amount sensor 21 may be integrally formed with the heat sink 11b for cooling the LED 11. Moreover, a liquid coolant may be flown inside the integrally-formed heat sink. Instead, the LED 11 and the light amount sensor 21 may be cooled by a forcing cooler such as an air cooling fin or a liquid type cooler. In addition, light shielding members for preventing light from the LEDs 11 from being emitted directly to a screen or the like (for preventing light from straying) are sometimes provided to the outer sides of the aforementioned lighting systems 51. In this case, the light amount sensor 21 may be provided on the light shielding member. In addition, the light shielding member may be composed of a material having good heat conductance, and may also serve as a heat sink for the light amount sensor 21.

Furthermore, the property information on the light amount proportional to the drive current of the light source under the plural levels of the temperature may be stored as a function of the drive current-light amount property, instead of the foregoing data base of the drive current-light amount property.

Note that the solid-state light source has been described by taking the LED as the example in the first embodiment, but this is not limited to the LED. Obviously, an LD (laser diode) may be also employed for the solid-state light source.

Second Embodiment (Outline of Image Display Device)

Here, an outline of an image display device according to a second embodiment will be described by referring to the drawing. FIG. 5 is a diagram schematically showing a projection image display device 200 according to the second embodiment.

As shown in FIG. 5, the projection image display device 200 includes a projection lens unit 210, and projects image light magnified by the projection lens unit 210 onto a screen 300. The projection lens unit 210 includes solid-state light sources such as LEDs (light emitting diodes) or LDs (laser diodes) as light sources.

(Schematic Configuration of Lighting Unit)

Figure 6:
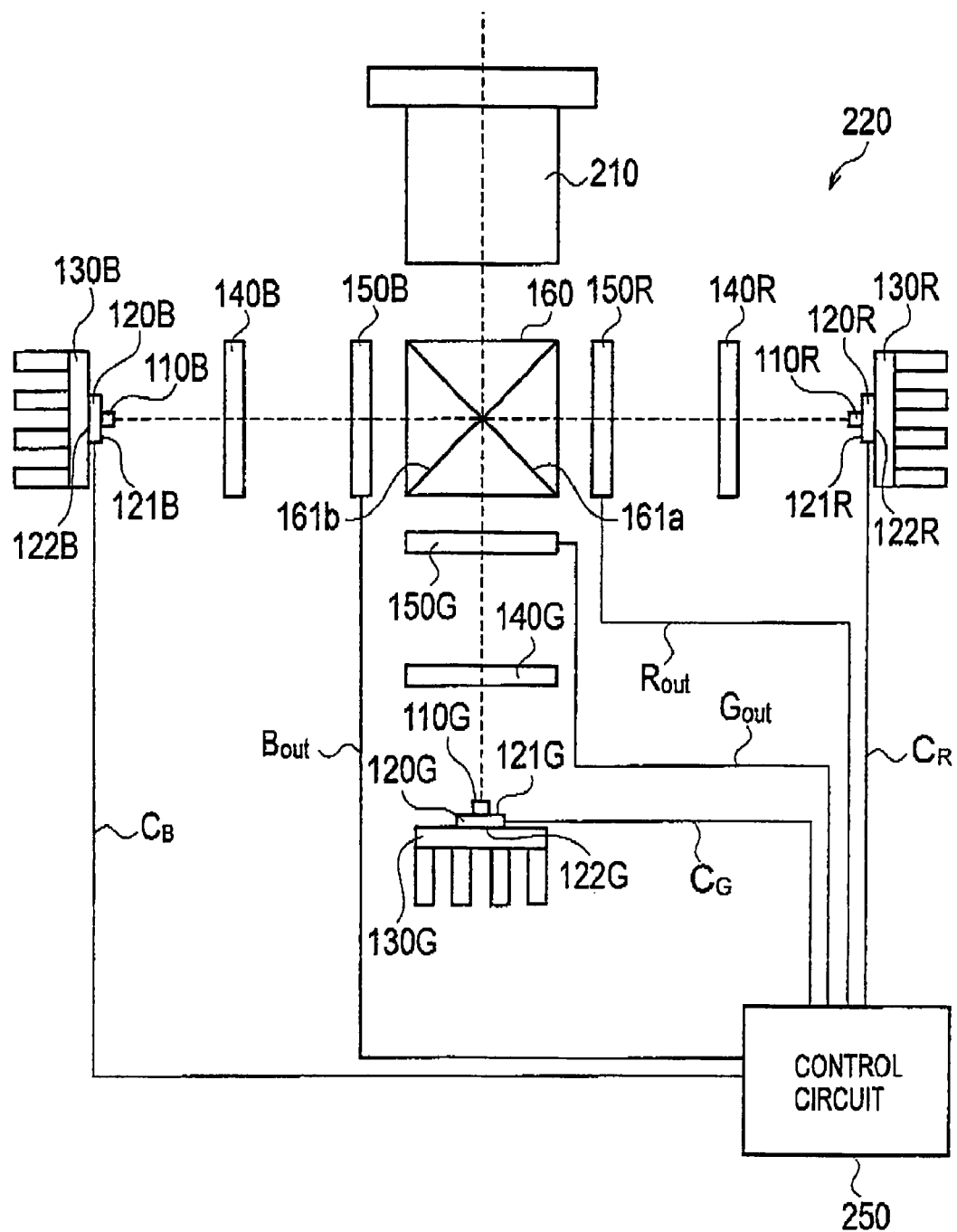
FIG. 6 is a diagram showing a schematic configuration of a lighting unit 220 according to the second embodiment.

Hereinafter, a schematic configuration of a lighting unit according to the second embodiment will be described by referring to the drawing. FIG. 6 is a diagram showing a schematic configuration of a lighting unit 220 according to the second embodiment.

As shown in FIG. 6, the lighting unit 220 includes a plurality of solid-state light sources 110 (solid-state light sources 10R, 110G and 110B), a plurality of Peltier devices 120 (Peltier devices 120R, 120G and 120B), a plurality of heat sinks 130 (heat sinks 130R, 130G and 130B), a plurality of diffraction elements 140 (diffraction elements 140R, 140G and 140B), a plurality of liquid crystal panels 150 (liquid crystal panels 150R, 150G and 150B) and a cross dichroic cube 160.

The solid-state light source 110R is a solid-state light source such as an LED or an LD for emitting red component light. The solid-state light source 110R has directivity, and the red component light emitted from the solid-state light source 110R is spotlight. Similarly, the solid-state light sources 110G and 110B are solid-state light sources such as LEDs or LDs for emitting green component light and blue component light, respectively. The solid-state light sources 110G and 110B also have directivity, the green component light and the blue component light emitted from the solid-state light sources 110G and 110B are also spotlight. It should be noted that the shape of the spotlight emitted from each of the solid-state light sources may be controlled in a line shape (a rectangular shape) by a special-purpose lens.

The Peltier device 120R includes an absorption surface 121R from which heat is removed by power supply, and a heat radiation surface 122R to which the heat removed from the absorption surface 121R is transferred. The absorption surface 121R is provided with the solid-state light source 110R, and the heat radiation surface 122R is provided with the heat sink 130R.

Similarly, the Peltier device 120G includes an absorption surface 121G and a heat radiation surface 122G. The absorption surface 121G is provided with the solid-state light source 110G, and the heat radiation surface 122G is provided with the heat sink 130G. The Peltier device 120B includes an absorption surface 121B and a heat radiation surface 122B. The absorption surface 121B is provided with the solid-state light source 110B and the heat radiation surface 122B is provided with the heat sink 130B.

Here, the cooling powers of the Peltier devices 120R, 120G and 120B are controlled according to control signals (control signals CR, CG and CB) obtained from a control circuit 250, which will be described later.

The heat sink 130R is composed of a heat conductive material such as metal, and radiates the heat transferred to the heat radiation surface 122R of the Peltier device 120R. Similarly, the heat sinks 130G and 130B are composed of heat conductive materials such as metal, and radiate the heat transferred to the heat radiation surface 122G of the Peltier device 120G, and to the heat radiation surface 122B of the Peltier device 120B, respectively. Note that it is preferable that the heat sinks 130R, 130G and 130B be cooled by cooling fans (not illustrated) communicated with the outside of the projection lens unit 210.

The diffraction element 140R homogenizes the red component light emitted by the solid-state light source 110R, and the liquid crystal panel 150R is irradiated with the homogenized red component light. Similarly, the diffraction elements 140G and 140B respectively homogenize green component light and blue component light emitted by the solid-state light sources 110G and 110B, and then the liquid crystal panels 150G and 150B are irradiated with the homogenized green and blue component light, respectively.

The liquid crystal panel 150R is an optical modulator of modulating the red component light emitted by the solid-state light source 110R according to a red input signal Rin, and thus of controlling the light amount of the red component light to be projected onto the screen 300. Similarly, the liquid crystal panels 150G and 150B are optical modulators of respectively modulating the green and blue component light emitted by the solid-state light sources 110G and 110B according to green and blue input signals Gin and Bin, and thus of respectively controlling the light amounts of the green and blue component light to be projected onto the screen 300.

The cross dichroic cube 160 combines the red component light, the green component light and the blue component light emitted by the liquid crystal panels 150R, 150G and 150B. Specifically, the cross dichroic cube 160 includes mirror faces 161a and 161b. The mirror face 161a reflects the red component light toward the projection lens unit 210 and allows the green component light to pass therethrough toward the projection lens unit 210. The mirror face 161b reflects the blue component light toward the projection lens unit 210, and allows the green component light to pass therethrough toward the projection lens unit 210.

The control circuit 250 is connected to the lighting unit 220 (the Peltier devices 120 and the liquid crystal panels 150).

The control circuit 250 controls the cooling powers of the Peltier devices 120 and the modulation amounts of the liquid crystal panels 150 according to input image signals (a red input signal Rin, a green input signal Gin and a blue input signal Bin). To be more precise, to the respective Peltier devices 120, the control circuit 250 inputs control signals (control signals CR, CG and CB) determined according to the input image signals. To the respective liquid crystal panels 150, the control circuit 250 inputs output image signals (a red output signal Rout, a green output signal Gout and a blue output signal Bout) determined according to the input image signals.

(Configuration of Control Circuit)

Figure 7:
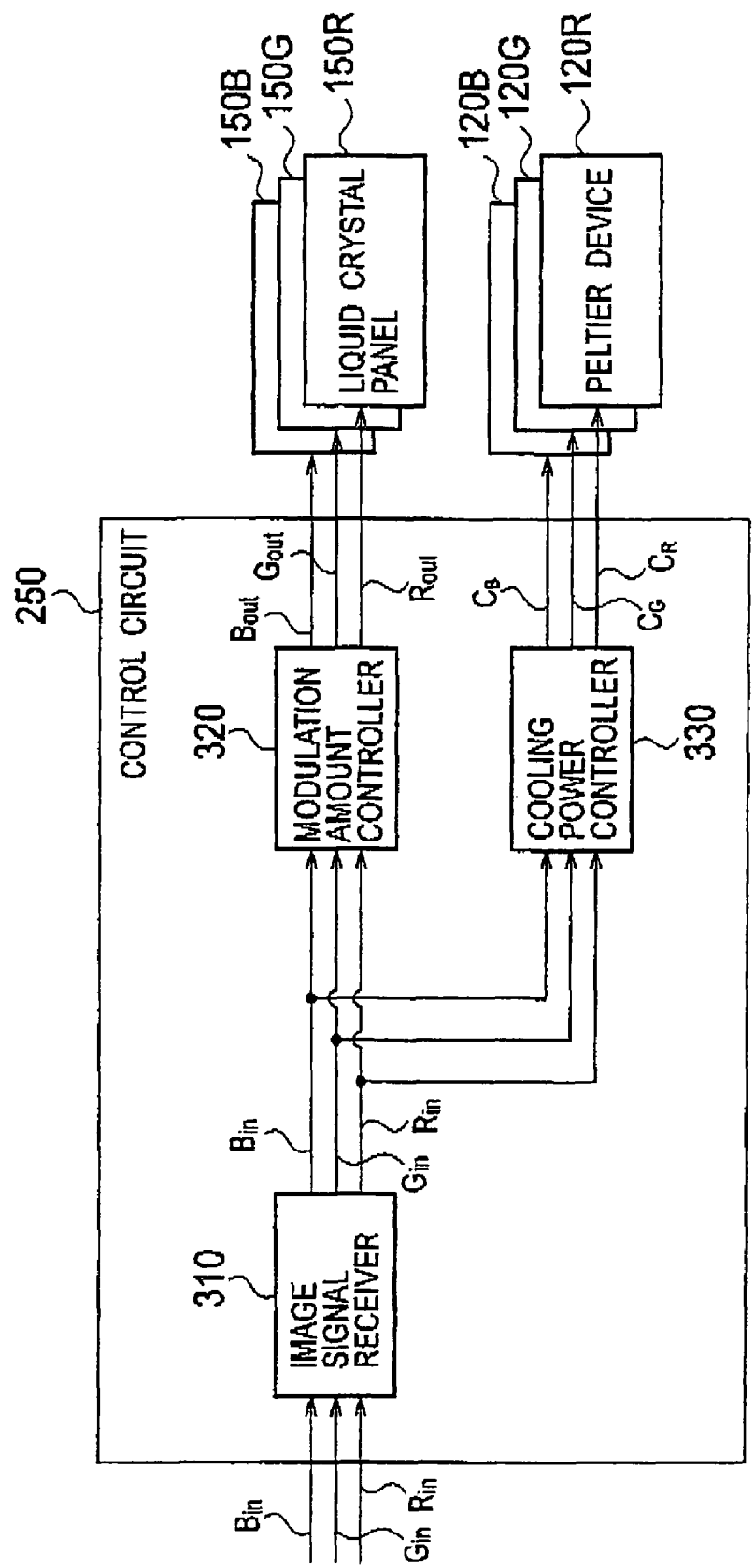
FIG. 7 is a block diagram showing a configuration of a control circuit 250 according to the second embodiment.

Hereinafter, a configuration of the control circuit according to the second embodiment will be described by referring to the drawing. FIG. 7 is a block diagram showing the configuration of the control circuit 250 according to the second embodiment.

As shown in FIG. 7, the control circuit 250 includes an image signal receiver 310, a modulation amount controller 320 and a cooling power controller 330.

The image signal receiver 310 is an interface that receives the input image signals (the red input signal Rin, the green input signal Gin and the blue input signal Bin. The image signal receiver 310 inputs the input image signals to the modulation amount controller 320 and the cooling power controller 330.

The modulation amount controller 320 controls the modulation amounts of the respective liquid crystal panels 150 according to the input image signals. To be more precise, the modulation amount controller 320 determines the red output signal Rout according to the red input signal Rin, and inputs the red output signal Rout to the liquid crystal panel 150R. Similarly, the modulation amount controller 320 determines the green output signal Gout and the blue output signal Bout according to the green input signal Gin and the blue input signal Bin, respectively, and inputs the green output signal Gout and the blue output signal Bout to the liquid crystal panel 150G and the liquid crystal panel 150B, respectively.

Here, it should be noted that the modulation amount controller 320 executes y correction processing or the like as needed.

The cooling power controller 330 controls the cooling powers of the respective Peltier devices 120 according to the input image signals. To be more precise, the cooling power controller 330 determines a control signal CR according to the red input signal Rin, and inputs the control signal CR to the Peltier device 120R. Here, the cooling power controller 330 specifies the luminance of the red component light to be projected onto the screen 300 according to the red input signal Rin. As the luminance of the red component light is higher, the cooling power controller 330 inputs the control signal CR of more increasing the cooling power of the Peltier device 120R to the Peltier device 120R.

Similarly, the cooling power controller 330 determines the control signals CG and CB according to the green input signal Gin and the blue input signal Bin, respectively, and inputs the control signals CG and CB to the Peltier devices 120G and 120B. Here, the cooling power controller 330 specifies the luminances of the green component light and the blue component light to be projected onto the screen 300 according to the green input signal Gin and the blue input signal Bin, respectively. As the luminances of the green component light and the blue component light are higher, the cooling power controller 330 inputs the control signals CG and CB of more increasing the cooling power of the Peltier devices 120G and 120B to the Peltier devices 120G and 120B, respectively.

For example, in a case where the luminance specified according to the input image signals is not more than a predetermined threshold value, the cooling power controller 330 controls the cooling power of each of the Peltier devices 120 in a normal performance mode. In contrast, in a case where the luminance specified according to the input image signals is more than a predetermined threshold value, the cooling power controller 330 controls the cooling power of each of the Peltier devices 120 in a high performance mode. The high performance mode is a mode in which the cooling power is more increased than that in the normal performance mode.

In addition, the cooling power controller 330 may includes a table in which the luminance of the component light of each color is associated with the cooling power of the Peltier device 120, and may determine the control signal by referring to the table. Here, it should be noted that the higher the luminance, the stronger the cooling power of the Peltier device 120, in this table.

(Example of Light Emission Property of Solid-State Light Source)

Figure 8:
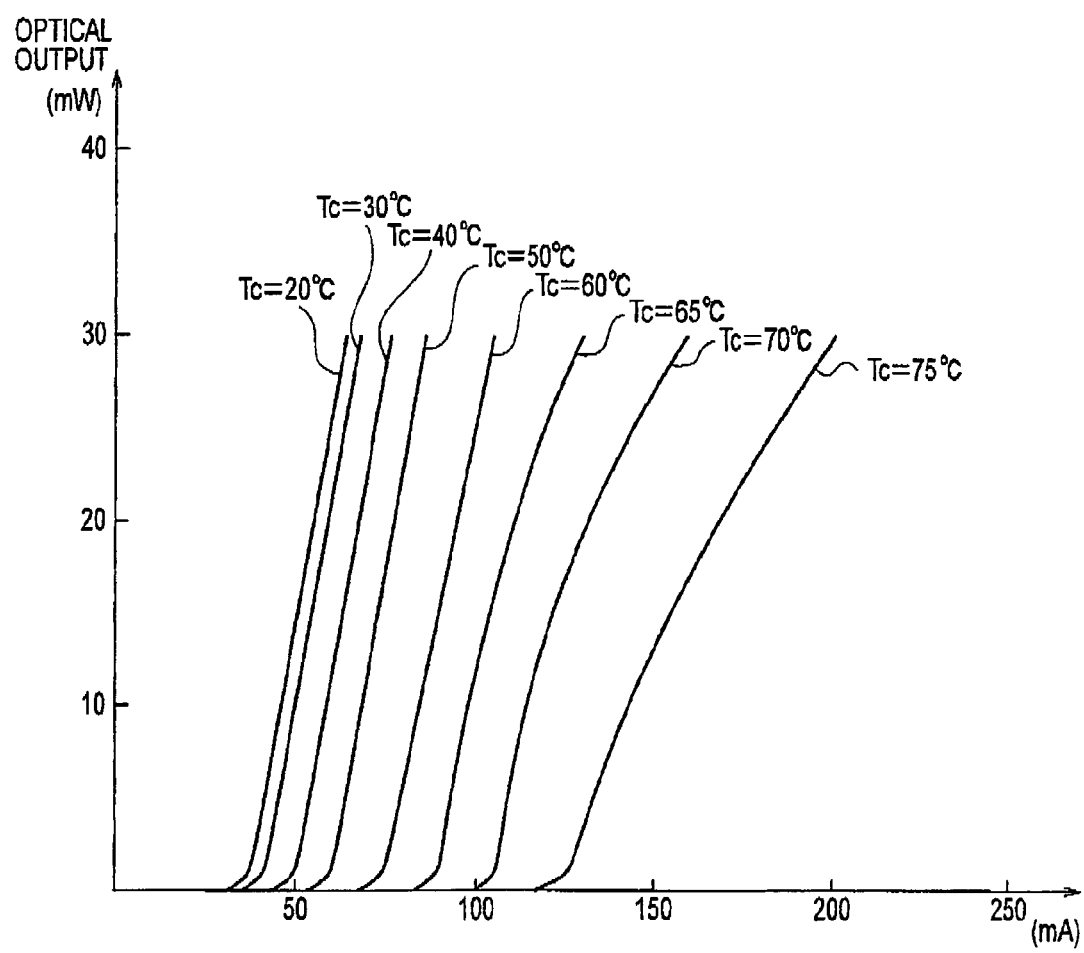
FIG. 8 is a diagram showing one example of a light emission property of a solid-state light source 110 according to the second embodiment.

Hereinafter, one example of the light emission property of the solid-state light source according to the second embodiment will be described by referring to the drawing. FIG. 8 is a diagram showing one example of the light emission property of the solid-state light source 110 according to the second embodiment.

As shown in FIG. 8, the outgoing light amount (light amount) of the solid-state light source 110 depends on the environmental temperature (Tc) of the solid-state light source 110. Specifically, the lower the environmental temperature (Tc) of the solid-state light source 110, the higher the outgoing light amount of the solid-state light source 110. In other words, the higher the cooling power of the Peltier device 120, the higher the outgoing light amount of the solid-state light source 110.

(Method of Controlling Cooling Power of Cooling Device)

Figure 9A:
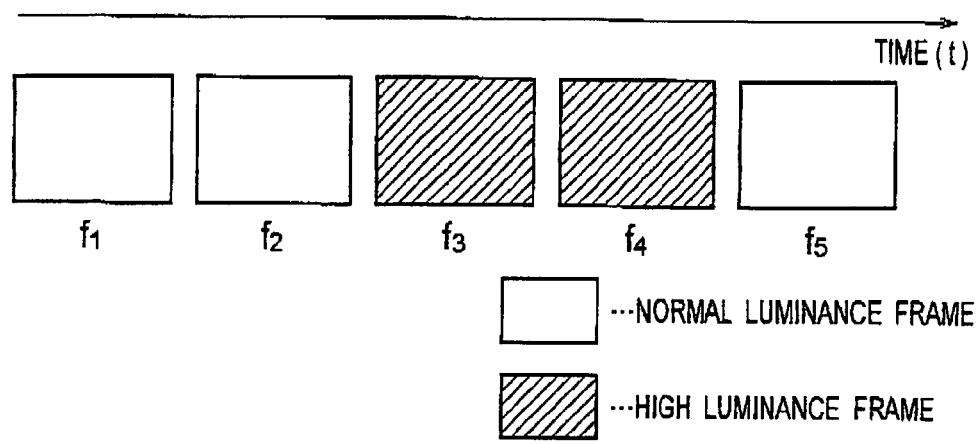
FIGS. 9A to 9C are diagrams showing a method for controlling a cooling power of a Peltier device 120 according to the second embodiment.
Figure 9B:
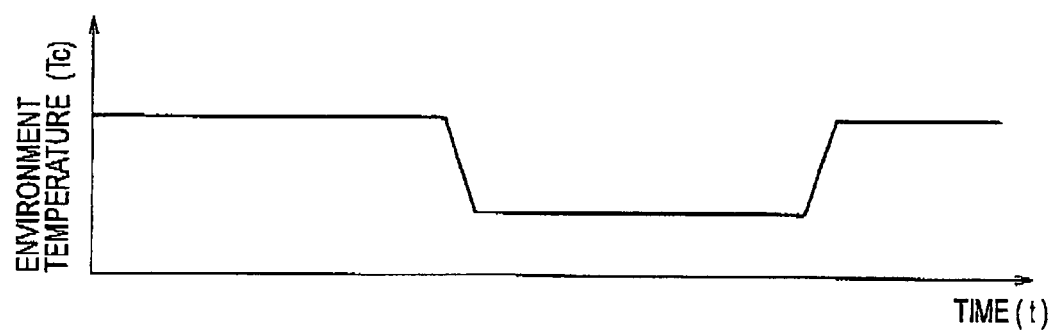
Figure 9C:
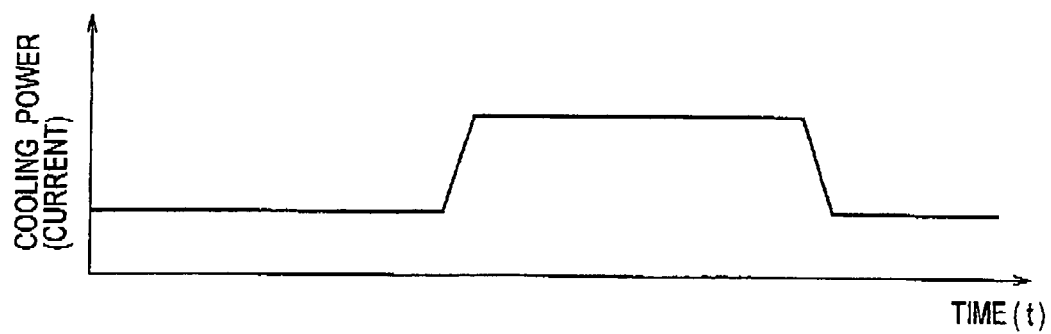

Hereinafter, a method of controlling the cooling power of the cooling device according to the second embodiment will be described by referring to the drawings. FIGS. 9A to 9C are diagrams showing the method of controlling the cooling power of the cooling device according to the second embodiment.

Here, the description will be provided by taking as an example a case where the luminances of frames f3 and f4 are higher than those of the other frames f1, f2 and f5 as shown in FIG. 9A.

As shown in FIG. 9B, the cooling power of the Peltier device 120 is controlled so that the environmental temperature (Tc) of solid-state light source 110 is lower in a time period corresponding to the frames f3 and f4 than that in a time period corresponding to the other frames (frames f1, f2 and f1).

For this reason, the current amount supplied to the Peltier device 120 is larger in the time period corresponding to the frames f3 and f4 than that in the time period corresponding to the other frames (frames f1, f2 and f5), as shown in FIG. 9C.

In other words, the cooling power of each of the Peltier devices 120 is controlled in the normal performance mode in the time period corresponding to the frames (frames f1, f2 and f5), and controlled in the high performance mode in the time period corresponding to the frames f3 and f4.

(Operation of Image Display Device)

Figure 10:
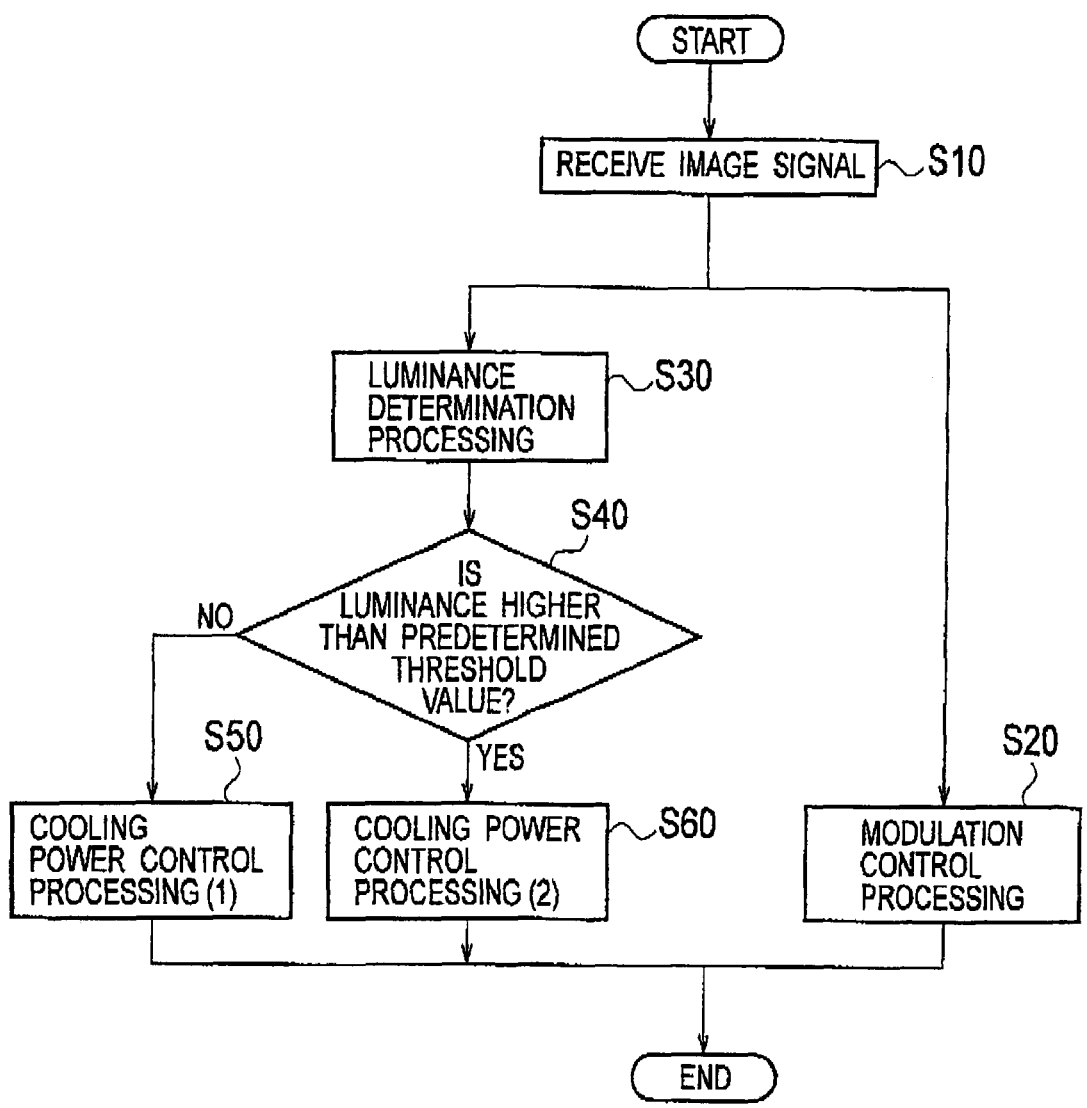
FIG. 10 is a flowchart showing an operation of the projection image display device 200 according to the second embodiment.

Hereinafter, an operation of the image display device according to the second embodiment will be described by referring to the drawing. FIG. 10 is a flowchart showing the operation of the projection image display device 200 according to the second embodiment.

As shown in FIG. 10, the projection image display device 200 receives the input image signals (the red input signal Rin, the green input signal Gin and the blue input signal Bin) in step S10.

In step S20, the projection image display device 200 determines the output image signals (the red output signal Rout, the green output signal Gout and the blue output signal Bout) according to the input image signals, and controls the modulation amount of each of the liquid crystal panels 150.

In step S30, the projection image display device 200 determines the luminance of an image to be projected onto the screen 300 according to the input image signals. To be more precise, the projection image display device 200 determines the luminance of the red component light according to the red input signal Rin. Similarly, the projection image display device 200 determines the luminances of the green component light and the blue component light according to the green input signal Gin and the blue input signal Bin.

In step S40, the projection image display device 200 judges whether or not the luminance of each of the red component light, the green component light and the blue component light exceeds the predetermined threshold value. Then, the projection image display device 200 shifts the operation to the processing in step S60 if the luminance of the image (the red component light, the green component light or the blue component light) is more than the predetermined threshold value. Instead, the projection image display device 200 shifts the operation to the processing in step S50 if the luminance of the image (the red component light, the green component light or the blue component light) is not more than the predetermined threshold value.

In step S50, the projection image display device 200 controls the cooling power of the Peltier device 120 (the Peltier device 120R, 120G or 120B) in the normal performance mode. It should be noted that the processing in step S50 is executed for only the Peltier device 120 corresponding to the color component light whose luminance is determined as being not more than the predetermined threshold value.

In step S60, the projection image display device 200 controls the cooling power of the Peltier device 120 (the Peltier device 120R, 120G or 120B) in the high performance mode. It should be noted that the processing in step S60 is executed for only the Peltier device 120 corresponding to the color component light whose luminance is determined as being more than the predetermined threshold value.

Note that the processing in step S20 and the processing in step S50 (or step S60) are executed in synchronization with each other, as a matter of course. A frame buffer capable of storing input image signals corresponding to one frame may be used for the purpose of synchronizing the processing in step S20 and the processing in step S50 (or step S60).

(Effects)

According to the projection image display device 200 according to the second embodiment, the environmental temperatures of the solid-state light sources 110 can be appropriately decreased without continuously applying high currents to the Peltier devices 120, since the cooling power controller 330 controls the cooling powers of the Peltier devices 120 according to the input image signals received by the image signal receiver 310. Accordingly, it is possible to increase the luminance of an image as needed without increasing the current amounts supplied to the solid-state light sources 110.

In other words, the luminance of an image can be increased while suppressing loads imposed on the solid-state light sources 110 and the Peltier devices 120.

Third Embodiment

Hereinafter, a third embodiment will be described by referring to the drawings. The description will be given below mainly for different points between the foregoing second embodiment and the third embodiment.

Precisely, although not described in the foregoing second embodiment, in the third embodiment, a solid-state light source is provided to each of a plurality of segmented regions provided to an optical modulator, and a cooling modulator is provided to each of the plurality of solid-state light sources. Each of the cooling devices is controlled according to input image signals corresponding to its segmented region.

(Method for Controlling Cooling Power of Cooling Device)

Hereinafter, a method for controlling the cooling power of the cooling device according to the third embodiment will be described by referring to the drawings. FIGS. 11A and 11B are conceptual diagrams for explaining a method for controlling the cooling power of the Peltier device 120 according to the third embodiment.

As shown it FIG. 11A, solid-state light sources 110 (a solid-state light source $110_{1\text{-}3}$ to a solid-state light source $110_{5\text{-}3}$) are respectively provided to a plurality of segmented regions (a segmented region$_{1\text{-}1}$ to a segmented region$_{5\text{-}3}$), and are arranged in an array. Peltier devices 120 (a Peltier device $120_{1\text{-}1}$ to a Peltier device $120_{5\text{-}3}$) are respectively provided to the plurality of solid-state light sources 110.

As shown in FIG. 11B, take an example of a case where the segmented regions $_{3\text{-}1}$, $_{2\text{-}2}$, $_{3\text{-}2}$ and $_{4\text{-}2}$ (high luminance segmented regions) have higher luminance than the other segmented regions (normal luminance segmented regions).

The cooling powers of the Peltier devices 120 (the Peltier devices $120_{3\text{-}1}$, $120_{2\text{-}2}$, $120_{3\text{-}2}$ and $120_{4\text{-}2}$) corresponding to the high luminance segmented regions are controlled in the high performance mode. On the other hand, the cooling powers of the Peltier devices 120 corresponding to the normal luminance segmented regions are controlled in the normal performance mode.

(Effect)

According to the projection image display device 200 of the third embodiment, the cooling power controller 330 controls the cooling power of each Peltier device 120 provided to one of the segmented regions according to input image signals corresponding to the segmented region. In this way, the luminance of an image can be further appropriately increased while suppressing loads imposed on the solid-state light sources 110 and the Peltier devices 120.

Fourth Embodiment

Hereinafter, a fourth embodiment will be described by referring to the drawings. The description will be given below mainly for different points between the foregoing second embodiment and the fourth embodiment.

Specifically, although the drive current of the solid-state light source 110 is not particularly involved in the foregoing second embodiment, the drive current of a solid-state light source 110 is also controlled in addition to the cooling power of the Peltier device 120 in the fourth embodiment.

(Configuration of Control Circuit)

Hereinafter, a configuration of a control circuit according to the fourth embodiment will be described by referring to the drawings. FIG. 12 is a block diagram showing a configuration of a control circuit 250 according to the fourth embodiment. Note that the same reference numerals are provided to the same components as those in the foregoing second embodiment.

As shown in FIG. 12, the control circuit 250 includes a drive current controller 340 in addition to the components shown in FIG. 7. Moreover, each of solid-state light sources 110 is provided with each of temperature sensors 170 (temperature sensors 170R, 170G and 170B) side by side, and the temperature sensors 170 respectively measures the environmental temperatures of the solid-state light sources 110.

Here, it should be noted that, when it is judged that the luminance of an image determined according to input image signals is high, a cooling power controller 330 increases the cooling power of each of the Peltier devices 120 in advance before the image having the high luminance is displayed, in the fourth embodiment.

More precisely, the cooling power controller 330 includes a frame buffer for storing input image signals corresponding to one to a plurality of frames. The cooling power controller 330 judges whether or not the luminance of a judgment frame (image) that is to be displayed after a predetermined period following the present frame exceeds a predetermined threshold value. When the luminance of the judgment frame (image) exceeds the predetermined threshold value, the cooling power controller 330 increase the cooling power of each of the Peltier devices 120 when the present frame is displayed.

Here, it should be noted that the predetermined period between the present frame and the judgment frame is determined according to a period (a cooling period) required until the solid-state light source 110 is actually cooled down after a command to increase the cooling power of the Peltier device 120 is issued, for example.

A drive current controller 340 controls the drive currents of the respective solid-state light sources 110 according to the input image signals (the red input signal Rin, the green input signal Gin and the blue input signal Bin) obtained from an image signal receiver 310, and to the environmental temperatures (the environmental temperature TR, TG and TB) of the solid-state light sources 110 obtained from the respective temperature sensors 170.

More specifically, when the environmental temperature TR of the solid-state light source 110R decreases since the luminance of the red component light specified according to the red input signal Rin is not higher than a predetermined threshold value (the normal performance mode), the drive current controller 340 inputs a control signal IR to the solid-state light source 110R. This control signal IR for making an instruction to decrease the drive current of the solid-state light source 110R with the decrease of the environmental temperature TR. On the other hand, when the luminance of the red component light specified according to the red input signal Rin is higher than the predetermined threshold value (the high performance mode), the drive current controller 340 inputs a control signal IR to the solid-state light source 110R, and this control signal IR is for making an instruction to increase the drive current of the solid-state light source 110R.

Similarly, when the environmental temperatures TG and TB of the solid-state light sources 110G and 110B decrease since the luminances of the green and blue component light respectively specified according to the green and blue input signals Gin and Bin are not higher than the predetermined threshold value (the normal performance mode), the drive current controller 340 inputs control signals IG and IB respectively to the solid-state light sources 110G and 110B. The control signals IG and IB are for making instructions to decrease the drive currents of the solid-state light sources 110G and 110B with the decrease of the environmental temperatures TG and TB. On the other hand, in a case where the luminances of the green and blue component light specified according to the green and blue input signals Gin and Bin are higher than the predetermined threshold value (the high performance mode), the drive current controller 340 inputs control signals IG and IB respectively to the solid-state light sources 110G and 110B, and these control signals IG and IB are for making instructions to increase the drive currents of the solid-state light sources 110G and 110B.

Incidentally, as a matter of course, the operations of a modulation amount controller 320, the cooling power controller 330 and the drive current controller 340 are synchronized with each other by using the frame buffer capable of storing the input image signals, or the like.

(Method for Controlling Cooling Power of Cooling Device)

Hereinafter, a method for controlling the cooling power of a cooling device according to the fourth embodiment will be described by referring to the drawings. FIGS. 13A to 13D are diagrams showing the method for controlling the cooling power of the Peltier device 120 according to the fourth embodiment. Here, take an example of a case where the luminance of a frame 5 is higher than the luminances of the other frames (frames f1 to f4) as shown in FIG. 15A.

Figure 13A:
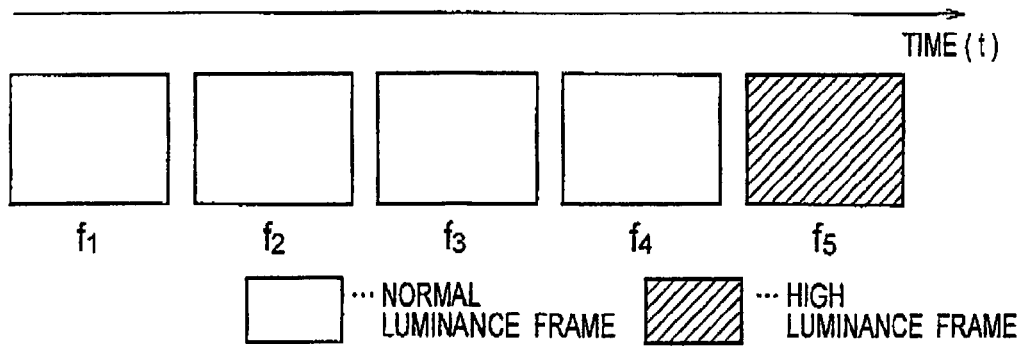
FIGS. 13A to 13D are diagrams for explaining a method for controlling a cooling power of a Peltier device 120 according to the fourth embodiment.
Figure 13B:
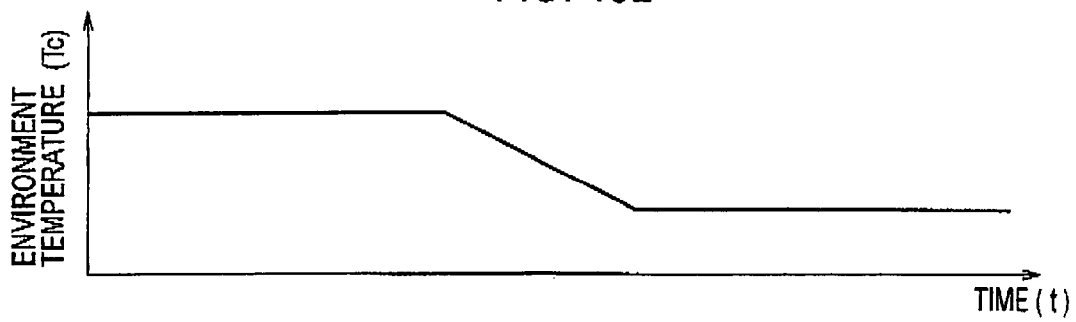

It is judged that the luminance of the frame f5 exceeds a predetermined threshold value in a time period corresponding to the frame 3 (in other words, before a predetermined time period preceding a time period corresponding to the frame f5), as shown in FIG. 13B. Then, the cooling power of each of the Peltier devices 120 is controlled so that the environmental temperature (Tc) of each of the solid-state light sources 110 would be decreased.

Figure 13C:
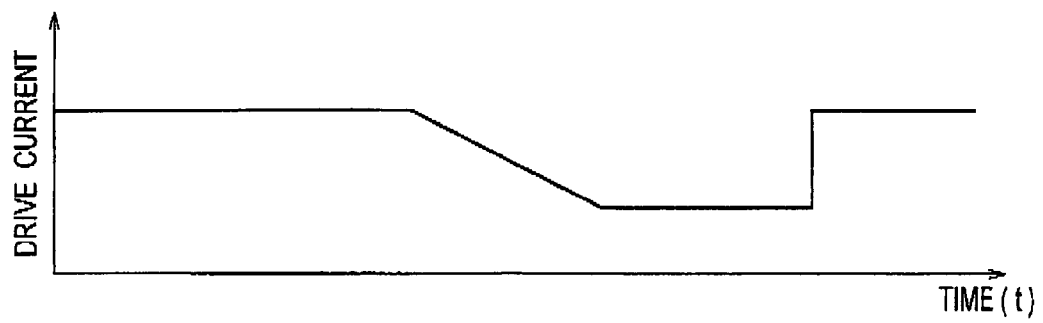
Figure 13D:
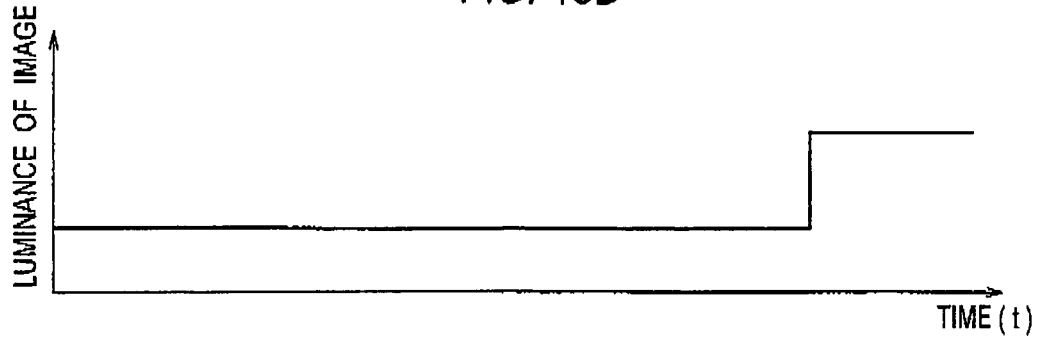

The drive current of each of the solid-state light sources 110 is firstly controlled so as to be decreased with the decrease of the environmental temperature (Tc) of the solid-state light source 110 as shown in FIG. 13C. Then, the drive current of each of the solid-state light sources 110 is controlled so as to be increased in the time period corresponding to the frame f5 having the high luminance.

Accordingly, the luminance of an image is kept constant in the time period corresponding to the frames f1 to f4, and then the luminance of the image is increased in the time period corresponding to the frame f5 having the high luminance.

(Effects)

According to a projection image display device 200 of the fourth embodiment, in a case where it is judged that the luminance of an image determined according to input image signals, the cooling power controller 330 increases the cooling power of each of the Peltier devices 120 in advance before the image having the high luminance is displayed.

In addition, the drive current controller 340 decreases the drive current of each of the solid-state light sources 110 with the decrease of the environmental temperature (Tc) of the solid-state light source 110. However, when an image having the high luminance is displayed, the drive current controller 340 increases the drive current of the each of the solid-state light sources 110.

Accordingly, the light amounts emitted by the solid-state light sources 110 can be kept constant when the luminance of an image determined according to input image signals is low, while the light amounts emitted by the solid-state light sources 110 can be increased when the luminance of an image determined according to input image signals is high. In addition, it is possible to quickly increase the light amounts emitted by the solid-state light sources 110 by controlling the drive current of each of the solid-state light sources 110 in comparison with a case where the light amounts emitted by the solid-state light sources 110 are increased by using the cooling powers of the Peltier devices 120.

Other Embodiments

Although the present invention has been described by using the foregoing embodiments, it should not be understood that the descriptions and the drawings constituting part of this disclosure limit the present invention. Various alternative embodiments, modifications and applied techniques are obvious to those skilled in the art.

For example, the image display device in the foregoing embodiments is the projection image display device 200. However, the image display device is not limited to a projection image display device, and may be any device as long as it displays an image.

Although not described particularly in the foregoing embodiments, the projection image display device 200 may control both the cooling power of the cooling device and the current supplied to the solid-state light source according to input image signals. In this case, the cooling power of the cooling device and the current supplied to the solid-state light source are controlled in consideration of a relationship between the environmental temperature of the solid-state light source and the current supplied to the solid-state light source (see FIG. 8).

Although the cooling power of the Peltier device 120 is controlled in the 2 levels (the normal performance mode and the high performance mode), the controlling method is not limited to this. Precisely, the cooling power of the Peltier device 120 may be controlled in three levels or more, or may be controlled linearly instead of stepwise.

The transmissive liquid crystal panel (liquid crystal panel 150) is used as the optical modulator in the foregoing embodiments. However, the optical modulator is not limited to this. Specifically, a digital micro-mirror device (DMD) or a liquid crystal on silicon (LCOS) may be used as the optical modulator.

In the foregoing embodiments, the heat sink is used for the heat radiation member for radiating heat transferred to the heat radiation surface 22 of the Peltier device 120, but the heat radiation member is not limited to this. Specifically, heat transferred to the heat radiation surface 22 of the Peltier device 120 may be radiated by using a liquid coolant.

In the foregoing embodiments, the modulation amount controller 320 may adjust the output image signals (the red output signal Rout, the green output signal Gout and the blue output signal Bout) according to a combination of the input image signals (the red input signal Bin the green input signal Gin and the blue input signal Bin). Moreover, the modulation amount controller 320 may adjust the output image signals according to parameters specific to each of the solid-state light sources 110 (the drive current amount, the heating amount, the chromaticity coordinates and the like) in addition to the input image signals.

In the foregoing embodiments, the modulation amount controller 320 may adjust the output image signals (the red output signal Rout, the green output signal Gout and the blue output signal Bout) according to the cooling powers of the Peltier devices 120 (the control signals CR, CG and CB).

In the foregoing embodiments, the cooling power controller 330 may control the cooling power of the Peltier device 120 by using not only the luminance information of the input image signals but also the saturation and hue information of the input image signal.

In the foregoing embodiments, in order to secure a time period (a cooling time) required until the solid-state light source 110 is actually cooled down after an instruction to increase the cooling power of the Peltier device 120 is issued, the frame buffer may store input image signals corresponding to one to a plurality of frames, and the cooling power of each of the Peltier devices 120 may be controlled according to the input image signals stored in the frame buffer (a feed-forward method). In the feed-forward method, since the capacity of a frame buffer depends on the response speed (cooling period) of the Peltier device 120, a frame buffer with a large capacity is needed in some cases.

However, it should be noted that it is possible to gradually creating conditions capable of increasing the luminance of an image if images suitable for the high performance mode are continuously displayed for a certain number of frames, even in a case where the capacity of a frame buffer is small or where a frame buffer is not used.

What is claimed is:

1. A light source controller comprising:
a light source driver configured to supply a drive current to a solid-state light source;
a light amount sensor configured to detect an outgoing light amount from the solid-state light source;
a memory configured to store property information indicating a relationship between the drive current and the outgoing light amount, for each of environmental temperatures of the solid-state light source; and
a controller configured to control the drive current supplied from the light source driver, wherein,
the controller obtains from the memory the property information corresponding to the environmental temperature of the solid-state light source, according to the relationship between the drive current supplied from the light source driver and the outgoing light amount detected by the light amount sensor, and
the controller controls the drive current so as to bring the outgoing light amount close to a target light amount, according to the property information obtained.

2. The light source controller according to claim 1, wherein,
in a case where the property information corresponding to the environmental temperature of the solid-state light source is not stored in the memory, the controller specifies the property information corresponding to the environmental temperature approximate to the environment temperature of the solid-state light source, out of the property information stored in the memory, the controller calculates the property information corresponding to the environmental temperature of the solid-state light source by using the specified property information, and the controller controls the drive current so as to bring the outgoing light amount close to the target light amount, according to the calculated property information.

3. The light source controller according to claim 1, wherein the controller controls the drive current supplied from the light source driver so that the drive current would not exceed the maximum drive current that maximizes the outgoing light amount.

4. An image display device, comprising:
at least one optical modulator configured to modulate outgoing light from a solid-state light source;
a projection lens configured to project the light modulated by the at least one optical modulator; and
a light source controller according to any one of claims 1 to 3.

5. An image display device, comprising:
at least one optical modulator configured to modulate outgoing light from a plurality of solid-state light sources;
a projection lens configured to project the light modulated by the at least one optical modulator; and
a light source controller according to claim 3, wherein,
in a case where the drive current of one of the plurality of solid-state light sources is controlled so as to exceed the maximum drive current, the controller controls the drive currents of the other ones of the plurality of solid-state light sources while maintaining the white balance reproduced by the outgoing lights from the plurality of solid-state light sources.

6. An image display device, comprising:
a solid-state light source;
an optical modulator configured to modulate outgoing light from the solid-state light source;
a cooling device configured to cool the solid-state light source;
a signal receiver configured to receive an image signal used for determining a modulation amount of the optical modulator; and
a cooling power controller configured to control a cooling power of the cooling device according to the image signal received by the signal receiver.

7. The image display device according to claim 6, wherein,
the solid-state light source includes a plurality of solid-state light sources that are respectively provided to a plurality of segmented regions provided in the optical modulator,
the cooling device includes a plurality of cooling devices that are respectively provided to the plurality of solid-state light sources, and
the cooling power controller controls the cooling powers of the plurality of cooling devices according to the image signals corresponding to the respective segmented regions.

8. The image display device according to claim 6, wherein,
the cooling device is a Peltier device including an absorption surface from which heat is removed by power supply, and a heat radiation surface to which the heat removed from the absorption surface by the power supply is transferred,
the absorption surface is provided with the solid-state light source, and
the heat radiation surface is provided with a heat radiation member that radiates the heat transferred to the heat radiation surface.

9. The image display device according to claim 6, further comprising:
a drive current controller configured to control the drive current of the solid-state light source; and
a detection unit configured to detect the environmental temperature of the solid-state light source, wherein,
in a case where the luminance of an image to be displayed according to the image signal exceeds a predetermined threshold value, the cooling power controller increases the cooling power of the cooling device before the image having the luminance exceeding the predetermined threshold value is displayed,
the drive current controller decreases the drive current of the solid-state light source with a decrease of the environmental temperature of the solid-state light source, and increases the drive current of the solid-state light source when the image having the luminance exceeding the predetermined threshold value is displayed.

* * * * *